UNITED STATES PATENT OFFICE.

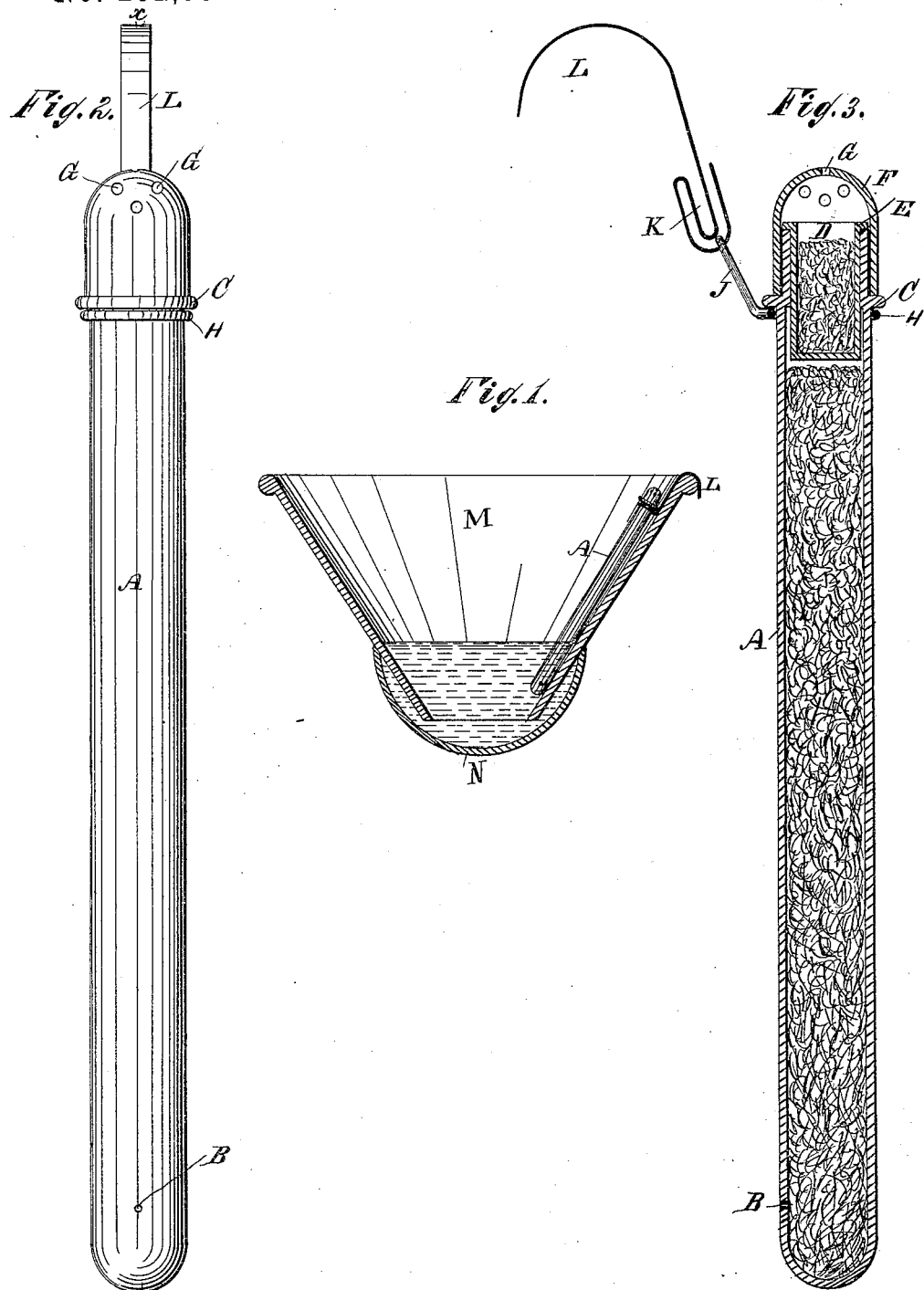

DWIGHT WARREN, OF WINSTED, CONNECTICUT, ASSIGNOR TO HIMSELF AND WILLIAM H. TAYLOR, OF SAME PLACE.

WATER-CLOSET DISINFECTING DEVICE.

SPECIFICATION forming part of Letters Patent No. 252,556, dated January 17, 1882.

Application filed July 23, 1881. (No model.)

*To all whom it may concern:*

Be it known that I, DWIGHT WARREN, of Winsted, in the county of Litchfield and State of Connecticut, have invented a new and Improved Water-Closet Disinfecting Device, of which the following is a specification.

The object of my invention is to facilitate cleansing, disinfecting, and deodorizing the entire contents of water-closets, and keeping the air therein fresh and free from bad and unhealthy odors and noxious gases.

The invention consists in a tube suspended on the side of the water-closet or urinal bowl, and containing a disinfecting compound, a part of which is dissolved by water entering into the tube through a very small aperture near the lower end of the same every time the bowl is flushed with water. Both the lower and upper ends of the tube are closed, the upper end being preferably closed by a cup containing vaporizable disinfectants or perfumes, and is covered by a perforated cap.

In the accompanying drawings, Figure 1 is a cross-sectional elevation of a water-closet bowl provided with my improved disinfecting device. Fig. 2 is a longitudinal elevation of my improved disinfecting device. Fig. 3 is a longitudinal sectional elevation of the same.

A tube, A, made of glass, rubber, metal, &c., is closed at the lower end, and provided with one or more very small apertures, B, a short distance from this lower end, and with a shoulder or collar, C, a short distance from the upper end. A cup-shaped vessel, D, provided with an external annular flange, E, at its upper edge, fits in the upper end of the tube A, the flange E resting on the upper edge of the tube A. A cap, F, provided with a series of apertures, G, fits over the upper end of the tube A, this cap resting on the collar C. A wire, H, is passed around the tube A directly below the collar C, and forms a loop, J, into which a hook, K, is passed, made in one with a larger hook, L, resting and catching on the upper edge of a water-closet bowl or urinal. The tube A rests against the sides of the bowl, and extends down to near the bottom of the bowl M. The diameter of the tube A can be greater or less, as circumstances may require, and the length of the tube may also be varied according to circumstances.

The upper end of the tube A may be closed by means of an ordinary stopper, in place of the devices described.

The device operates as follows: The tube A is filled with a suitable disinfecting-powder or mixture of powders, and the cup D is filled with a vaporizable disinfectant or perfume. When the water-closet is flushed the water in the pan N and bowl M rises so high that a small quantity of water can flow through the aperture B into the tube A and dissolve some of the disinfecting-powder, and when the water in the pan N flows off the solution of the disinfecting-powder flows from the tube and disinfects the contents of the bowl and pan. However, this disinfecting takes place immediately when the water in the bowl rises up to the aperture B, for a quantity of water always remains in the lower part of the tube A, below the aperture B, and dissolves the disinfecting-powder, and this chemical solution mixes itself with the water in the bowl and pan very rapidly. The water remaining in the pan contains a strong solution of the disinfecting-powder, and will immediately disinfect all liquids or matter dropping into it. The vaporizable disinfectant in the cup D is converted into vapor by the action of the air, which enters through the perforations G, and this vapor also passes off through those apertures and purifies and cleanses the air in the closet. As the chemical solution immediately disinfects the contents of the bowl, all foul air and bad and obnoxious smells in the water-closet are avoided.

If this device is modified slightly it can be used for urinals.

Having thus fully described my invention, I claim as new and desire to secure by Letters Patent—

1. A disinfector for water-closets, urinals, &c., consisting of a tube having one or more apertures in its closed lower end, and containing a dissolvable disinfectant, and a cup containing a vaporizable disinfectant in the upper end of the said tube, substantially as shown and described.

2. In a device for containing a disinfectant for water-closets, urinals, &c., the combination, with the tube A, of the cup-shaped vessel D and the perforated cap F, substantially as herein shown and described, and for the purpose set forth.

3. In a device for containing a disinfectant for water-closets, urinals, &c., the combination, with the tube A, of the shoulder or collar C, the wire loop J, and the double hook L K, substantially as herein shown and described, and for the purpose set forth.

DWIGHT WARREN.

Witnesses:
 ROLLIN H. COOKE,
 JULIUS H. WHITING.